(12) United States Patent
Vila

(10) Patent No.: US 6,880,863 B2
(45) Date of Patent: Apr. 19, 2005

(54) FLEXIBLE COUPLING FOR GAS CONDUITS

(75) Inventor: Smail Vila, Louisville, KY (US)

(73) Assignee: Delaware Capital Formation, Inc., Wilmington, DE (US)

( * ) Notice: Subject to any disclaimer, the term of this patent is extended or adjusted under 35 U.S.C. 154(b) by 31 days.

(21) Appl. No.: 10/456,075

(22) Filed: Jun. 6, 2003

(65) Prior Publication Data

US 2004/0245777 A1 Dec. 9, 2004

(51) Int. Cl.[7] .............................................. F16L 27/04
(52) U.S. Cl. ......................... 285/267; 285/95; 285/349; 277/616
(58) Field of Search ........................... 285/99, 261, 268, 285/269, 271, 121.7, 148.1, 144.1, 148.28, 148.4, 223, 267, 270, 272, 275, 263, 266, 361, 352, 335, 349; 277/616, 619, 589, 553, 578

(56) References Cited

U.S. PATENT DOCUMENTS

| | | | |
|---|---|---|---|
| 203,611 A | | 5/1878 | Graydon |
| 2,220,120 A | | 11/1940 | Plummer |
| 2,417,491 A | * | 3/1947 | Hill .............................. 285/349 |
| 2,421,691 A | * | 6/1947 | Gibson, Jr. et al. .......... 285/266 |
| 3,479,061 A | * | 11/1969 | Smookler et al. ............ 285/263 |
| 3,666,049 A | | 5/1972 | Kern et al. |
| 3,712,645 A | * | 1/1973 | Herter ......................... 285/351 |
| 3,746,372 A | * | 7/1973 | Hynes et al. ................ 285/263 |
| 3,929,355 A | * | 12/1975 | Sljusar ......................... 285/266 |
| 3,967,829 A | | 7/1976 | Rogers |
| 3,977,707 A | | 8/1976 | Oliver |
| 4,005,881 A | | 2/1977 | Burton et al. |
| 4,071,269 A | | 1/1978 | Halling |
| 4,139,221 A | | 2/1979 | Shotbolt |
| 4,311,313 A | | 1/1982 | Vedova |
| 4,427,220 A | | 1/1984 | Decker |
| 4,443,030 A | | 4/1984 | Hairston et al. |
| 4,618,173 A | | 10/1986 | Dopyera et al. |
| 4,893,847 A | | 1/1990 | Hess |
| 5,013,072 A | | 5/1991 | Roth |
| 5,048,873 A | | 9/1991 | Allread et al. |
| 5,088,775 A | | 2/1992 | Corsmeier |
| 5,106,129 A | | 4/1992 | Camacho et al. |
| 5,139,276 A | | 8/1992 | Balsells |
| 5,167,430 A | | 12/1992 | Bainbridge |
| 5,335,947 A | | 8/1994 | Remsburg |
| 6,257,625 B1 | | 7/2001 | Kitani et al. |
| 6,419,279 B1 | | 7/2002 | Latham |

* cited by examiner

Primary Examiner—Aaron Dunwoody
(74) Attorney, Agent, or Firm—Franklin L. Gubernick

(57) ABSTRACT

A flexible joint for connection between a pair of conduits for transferring a gas, under pressure, between the conduits. The joint includes a hollow, annular inner member for connection to one of the conduits which defines a spherically shaped, convex seal receiving surface and a hollow annular outer member which defines a spherically shaped, concave seal receiving surface for connection to another of the conduits. The outer member is mounted over the inner member such that the convex and concave surfaces are spaced apart and movable relative to one another about a common center point. Both the inner and outer members are open on opposite sides of their respective spherically shaped surfaces. The outer member may include and outer part and an intermediate part which is removably connected to the outer part. One of the members contains a single seal ring assembly retainer groove which opens toward and opposing one of the surfaces and which is centered on the center point. The other of the members contains a pair of spaced apart and registered seal ring retainer grooves having a common center line which intersects the center point. The grooves contain seal ring assemblies, each of which include at least one seal ring having a spherically shaped bearing surface which conforms to and engages an opposing one of the seal receiving surfaces.

41 Claims, 9 Drawing Sheets

FLEXIBLE COUPLING FOR GAS CONDUITS

BACKGROUND OF THE INVENTION

This invention relates to flexible sealed joints for conduits used to transfer a compressed gas, such as in an aircraft air duct system, wherein flexing of such joints is desirable for relieving high thermal and mechanical stresses and misalignment of connecting conduits.

Broadly speaking, flexible couplings for transferring a pressurized fluid between two conduits having at least some limited capability of relieving thermal and mechanical stresses have long been known and used in the prior art. See for example, U.S. Pat. No. 5,106,129 granted to L. A. Camacho et al. on Apr. 21, 1992 which discloses a coupling having a body portion which is both translatable in and out of a pair of collars located on the ends of opposing conduits and rotatable therein. The body portion can also be tilted between the two collars as when the centerlines of the two conduits are displaced relative to each other. U.S. Pat. No. 4,427,220 granted to M. S. Decker on Jan. 24, 1984 discloses a flexible joint for conduit which is used in jet engine air bleed duct systems.

A problem that has been encountered using the Decker joint is that the carbon rings used therein are readily subject to cracking and breakage with mechanical vibration of the joint. Further, in order to replace the rings, the joint must be removed from the air bleed system and sent to a suitably equipped repair station to open the joint and change the rings. It would be desirable to provide a sealed flexible coupling containing seal rings readily capable of withstanding long term exposure to mechanical and thermal stresses and vibrations without cracking and breakage. It would also be desirable to have a sealed flexible coupling which can readily be taken apart at the site of its use so that seal rings contained in the coupling can be easily replaced without the need to remove the coupling from its attached conduits to a remote repair station.

By means of the present invention, these and other problems encountered using flexible couplings known in the prior art can be eliminated.

SUMMARY OF THE INVENTION

It is an object of this invention to provide an improved flexible coupling for joining a pair of conduits for transfer of a pressurized gas between the conduits.

It is a further object of this invention to provide a novel flexible coupling for joining a pair of conduits, which coupling contains seal rings and which can be disassembled and reassembled for changing the rings without having to disconnect the coupling from the conduits.

It is another object of the present invention to provide a novel flexible coupling for joining a pair of conduits, which coupling contains seal rings which have enhanced ability to resist damage due to mechanical vibrations and thermal stresses to which the coupling may be exposed.

Briefly, in accordance with the present invention, a flexible coupling for transferring a pressurized gas between a first conduit and a second conduit is provided. The coupling includes a hollow annular inner member defining a spherically curved, convex seal receiving surface. A hollow annular outer member is also included which is mounted over the inner member and which defines a spherically curved, concave seal receiving surface conforming to and spaced from the convex surface. The concave surface and convex surface are movable relative to one another about a common center point. One of the members defines a first annularly extending seal ring assembly retainer groove which opens toward an opposing one of the surfaces and which is centered on the center point. The other of the members defines a second and at least partially defines a third seal ring assembly retainer groove. The second and third grooves are parallel to, in registry with and are spaced apart from one another, such that a common center line extending between the second and third grooves always intersects the center point regardless of the operative orientation of the members relative to one another. An annular end cap is further included which contains a peripheral skirt and an end wall defining a circular central opening. The end cap is disposed over the inner member and is connected to the outer member such that the end wall encloses one end of the outer member. A series of seal ring assemblies is included wherein a different one of the assemblies is disposed in each of the grooves. Each of the assemblies contains at least one seal ring which projects out of a corresponding one of the grooves, which seal ring contains a spherically shaped bearing surface which conforms to and which engages an opposing one of the seal receiving surfaces.

These and other objects, features and advantages of the present invention will become apparent to those skilled in the art from the following detailed explanation and attached drawings upon which, by way of example, only a preferred and certain other important embodiment(s) of the present invention are described and illustrated.

BRIEF DESCRIPTION OF THE DRAWINGS

FIGS. 2a, 2b and 2c show enlarged detail views of three spring biased, gas pressure energized gas seal ring assemblies used in the coupling of FIGS. 1 and 1a.

DESCRIPTION OF THE PREFERRED EMBODIMENTS

Figure 1:
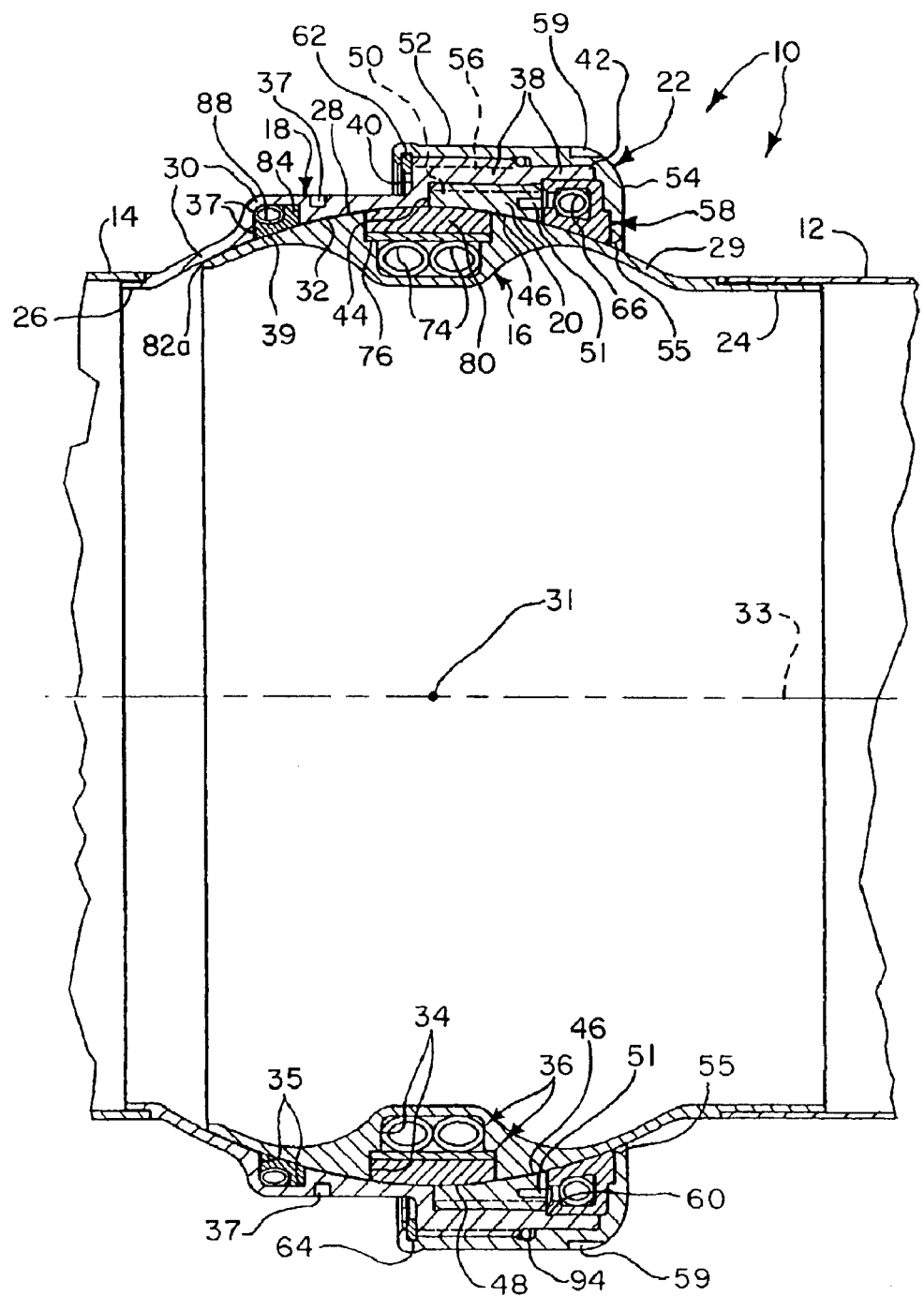
FIG. 1 shows a cross-sectional side elevation view of a flexible coupling joining a pair of conduits for transfer of gas, under pressure, between the conduits, thus illustrating a preferred embodiment of the present invention.

Referring now to the drawing figures and, in particular, to FIGS. 1, 1a and 2a–2c, there is shown, in a preferred embodiment of the present invention, a flexible joint or coupling, generally designated 10, through which a gaseous fluid, under pressure, can be transmitted between a pair of conventional hollow conduits 12 and 14. The body of the coupling 10 is adapted to carry a plurality of separate spring biased, gas pressure energized seal rings and seal ring assemblies, an O-ring and a single non-gas sealing mechanical retainer ring, there being five different locations containing such rings and/or assemblies in the present example. The type and structure of such rings and ring assemblies used in the coupling of this invention, will depend upon operating conditions to be encountered, such as temperature, gas pressure levels, and permissible levels of gas loss from the coupling itself. The coupling 10 of the present example contains ring assemblies adapted for operation at a maximum temperature of about 600° F. and a maximum gas pressure of about 200 psi.

The body of the coupling 10, being hollow and open ended so as to communicate with the conduits 12 and 14, contains three main hollow and annularly extending members including an inner member 16, an outer member 18 (which can also include a separate interconnected intermediate member 20) and a locking or end cap 22. The inner member, the outer member (including the intermediate member 20, unless otherwise indicated) and the cap are generally designated 16, 18 and 22, respectively. The inner member 16 is attachable on a first axial end portion 24, to the conduit 12, while the outer member 18 is attachable, on a first axial end portion 26, to the conduit 14, such as by welding or other conventional gas tight connection, wherein the coupling 10 is flexibly positioned for gas transfer between the two conduits as shown. The inner member 16 defines a spherically curved, convex, radially outwardly facing seal receiving surface 28 formed on a second axial end portion 29. The outer member 18 includes an axial mid-portion 30 which is connected, on one axial end, to the end portion 26 and which defines a spherically curved, concave, radially inwardly facing seal receiving surface 32. The concave surface 32 closely conforms to the curvature of the convex surface 28 and closely opposes at least a portion of the convex surface, depending upon the orientation of the outer member 18 relative to the inner member 16, since both members are movable relative to each other. How much of the surface 32 directly opposes the surface 28, and vice versa, depends upon the relative spatial attitude and/or angular displacement between the inner member 16 and conduit 12, on one hand, and that of the outer member 18 and the conduit 14, on the other hand. Compare, for example, FIG. 1, wherein the conduits 12 and 14 and the inner and outer members 16 and 18 are all aligned on a common centerline 33, with FIG. 1a, wherein the inner member and corresponding conduit are on a centerline 33a, while the outer member and corresponding conduit are on a separate centerline 33b. The centerlines 33a and 33b, when angulated, always intersect at a common center point 31 of the convex surface 28 and concave surface 32. The mid-portion 30 of the outer member 18 also defines a first radially inwardly opening groove 35 containing a first spring biased gas pressure energized, compression type gas seal ring assembly 37, a bearing surface 39 of which is spherically concave to closely conform to and slidably engage and seal against the convex surface 28.

The inner member 16 defines a circumferentially extending, radially outwardly opening groove 34, which is preferably axially centered on the end portion 29 so as to open on an axial central part of the convex surface 28. The radial center of the groove 34 is located at the center point 31. The groove 34 carries an expansion type, spring biased, gas pressure energized gas seal ring assembly, generally designated 36, which will be explained in more detail later herein. The outer member 18 also includes a second end portion 38 which is of generally L-shaped radial cross-section, as viewed in FIGS. 1–1a. A radially outwardly extending leg 40 of the second end portion 38 attaches to a second end of the outer member mid-portion 30. An axially extending leg 42, of the second end portion 38 is radially outwardly spaced from the inner member 16 and connects, on one end thereof, to a radially outer end of the leg 40.

To aid in the installation and removal of the outer member 18, with the ring assembly 37 operatively positioned in the groove 35, on and from the inner member 16, with the ring assembly 36 operatively position in the groove 34, a semi-circular spanner tool 25 (See FIG. 9) can be used. The tool 25 includes a pair of aligned handles 41 projecting outwardly from a semi-circular portion thereof at the ends of and essentially in the same plane as the semi-circular portion. The concave surface of the semi-circular portion is sized and shaped to conform to the periphery of the outer member mid portion 30 in the plane of a series of, preferably eight, radially outwardly opening and equally rotationally spaced apart blind holes 37 formed in the outer member 18. See FIGS. 1, 1a and 9. A thumb screw 43 located at the end of each of the handles 41 can be rotated to extend a pair of pins 45 radially inwardly toward one another from within opposite ends of a concave surface of the semi-circular portion of the tool. By reversing the rotation of the thumb screws 43, the corresponding pins 45 can be withdrawn back into the ends of the semi-circular portion. A third pin 47 projecting inwardly from the concave surface of the circular portion located rotationally mid-way between the retractable pins is fixed and need not be retractable. It is important that the pins 45, when extended, and the pin 47 match and align with three successive ones of the blind holes 37 formed in the outer member 18 when the tool is operatively positioned over the outer member in the plane of the blind holes. The tool 37 can be used to keep the member 18 from rotating as other members of the assembly 10 are rotated to remove them from the member 18 as later more fully explained.

The intermediate member 20 is disposed radially between the convex surface 28 and ring assembly 36, on its radially inner side, and the leg 42 of the outer member 18, on its radially outer side. A first axial end 44 of the member 20 abuts an end of the mid-portion 30 and the leg 40 of the outer member 18. The intermediate member 20 includes a spherically curved, concave, radially inwardly facing surface 46 which closely conforms to the outwardly facing convex surface 28 of the inner member 16 and, additionally, to a spherically crowned outwardly facing surface 48 of the ring assembly 36. The concave surface 46 (FIG. 1), of the intermediate member 20 cooperates with the concave surface 32 of the outer member 18 to oppose the convex surface 28 in a closely spaced manner, preferably a spacing of from about 0.005 to about 0.010 inch in the present example at typical operating temperature. The members 18 and 20 of the present example are separate and removably connected so that the coupling 10 can be disassembled and reassembled at the site of use without removal from the conduits 12 and 14, as when necessary to change seal ring assemblies contained therein. But, when the members 18 and 20 are connected, as shown, they cooperate as though they were a single, hollow annular outer member wherein their concave surfaces adjoin in a smooth and continuous manner. A second axial end portion of the leg 42 of the outer member 18, on a radially inwardly facing side thereof, and an opposing radially outwardly facing side of the intermediate member 20 are threaded and grooved in conformity with one another, as represented by dashed lines 50, so that they can be threadably secured to, and removed from, one another when necessary, such as when changing the ring assemblies.

Figure 8:
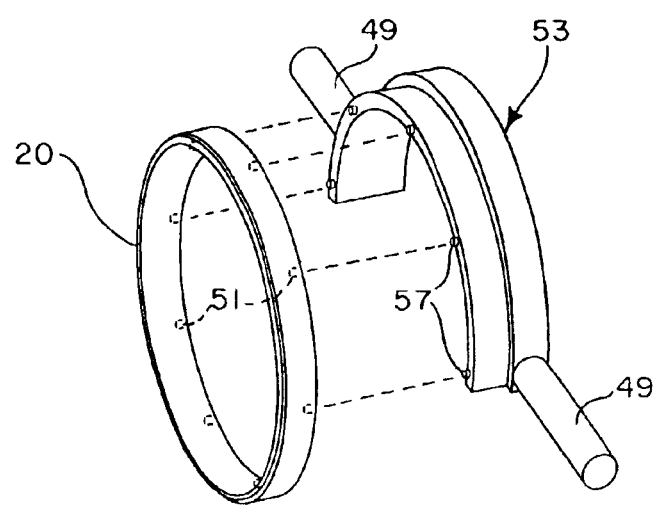
FIG. 8 shows an exploded perspective view of an intermediate member of the assembly of FIG. 1 and a spanner wrench that can be used to install and remove the member on and from an outer member of the assembly.

Referring now also to FIG. 8, a tool 53 having a semi-circular portion and a pair of handles 49 aligned with one another and projecting outwardly from opposite ends of the semi-circular portion, contains a series, preferably five, of equally rotationally spaced apart pins 57. The pins 57 project from a side of the tool 53 perpendicular to a plane containing the side. The pins 57 are adapted to align with and insert into blind holes 51 (See FIGS. 1, 1a and 8) in a side of the intermediate member 20 which opposes a ring assembly 58. The tool 53, when operatively positioned, can be rotated to threadably attach the intermediate member 20 to the outer member 18 and to remove the former from the latter while the tool 25 is used to keep the member 18 from rotating with the member 20.

The locking cap 22 includes an axially extending peripheral wall 52 and an adjacent cap end wall or shoulder 54 defining a circular central opening 55. The cap 22 is mounted over the end portion 24 of the inner member 16 before joining the conduit 12 to the end portion. The peripheral wall 52 contains a threaded and tapped, axially extending end portion which removably joins a conformingly threaded and tapped portion formed in a radially outer surface portion of the end portion 38 of the outer member 18, the adjoining threaded and grooved portions being represented by dashed lines 56. A third annular gas seal ring assembly, generally designated 58, is disposed around and radially between the convex surface 28 of the inner member 16 and a free end portion of the leg 42 of the outer member 18. The cap 22, when threadably tightened on the outer member 18, in the position as shown, compresses the seal ring assembly 58 between the cap shoulder 54 and a shoulder or ledge 60 on the leg 42 of the outer member 18. A conventional split steel retaining ring 62 is removably installed in a groove 64 (FIG. 1) in an axial end portion of the periphery 52 of the cap 22, so as to interfere with and oppose a radially outer end portion of the leg 42 of the outer member 18. The retainer ring 62 prevents the loosening or unthreading of the cap 22 from the member 18 which could otherwise occur due to mechanical vibrations, thermal expansion or contraction and the like. The cap end wall 54 completes confinement of the end portion 38, intermediate member 20 and seal ring assembly 58 within the cap 22. In the present example, the outer member 18, including the member 20, and the shoulder 54 of the cap 22 define a second radially inwardly opening groove for the ring assembly 58. The retaining ring 62 can be readily accessed for installation, removal and replacement as desired, through an annular, radially extending gap between a bore of the ring 62, as installed, and a radially inner end of the leg 40 at its joinder with an end of the mid-portion 30 of the outer member 18. The second seal ring assembly 58 is of generally C-shaped configuration, as viewed in cross section (FIG. 2b), in that it's hollow interior 66 (FIG. 2b) is surrounded by walls on three sides and is open on a fourth side, as at 68, facing an end surface of the intermediate member 20 (See FIG. 2b). Prior to installation of the ring 58, as shown, a compressible, canted spring 70 is installed through the opening 68 so as to be confined and compressed within the interior 66 so as to urge the three walls of the ring 58, as shown, to expand outwardly. A radially inwardly facing surface 72 of the ring 58 is spherically curved and is concave so as to closely conform to and slidably engage the convex surface 28 of the inner member 16. It is important that the shoulder 60 on the leg 42 of the outer member 18 provide a seat for the ring assembly 58 so that a small air gap 96 will exist between the assembly and an opposing end of the member 20, as best seen in FIG. 2b. The reason for this air gap 96 will be explained later herein.

Figure 7:
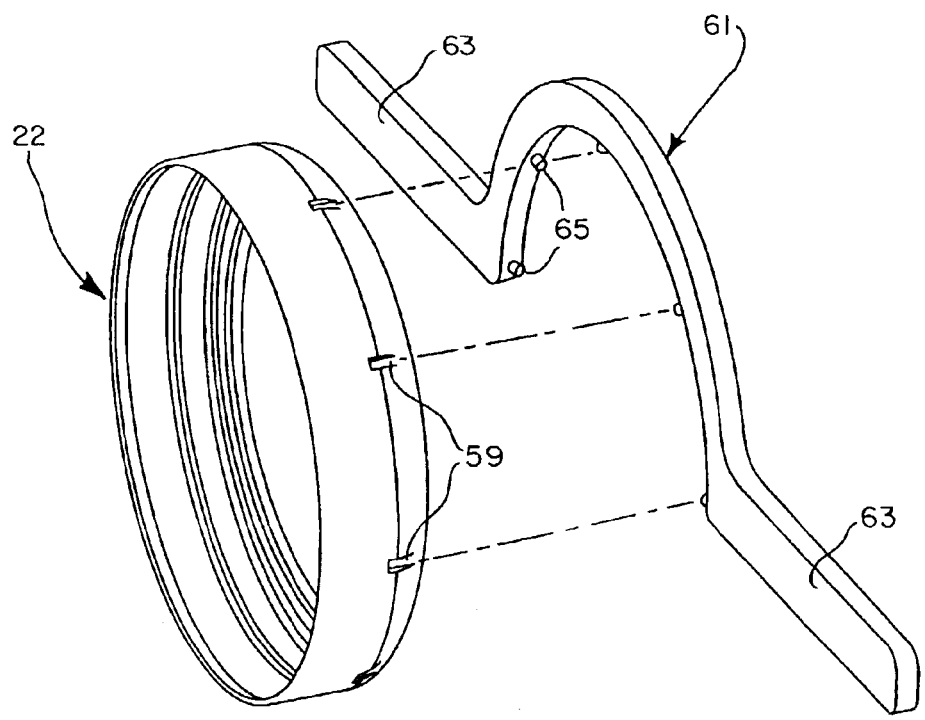
FIG. 7 shows an exploded perspective view of an end cap of the assembly of FIG. 1 and a spanner wrench that can be used to install and remove the cap on and from an outer member of the assembly.
Figure 9:
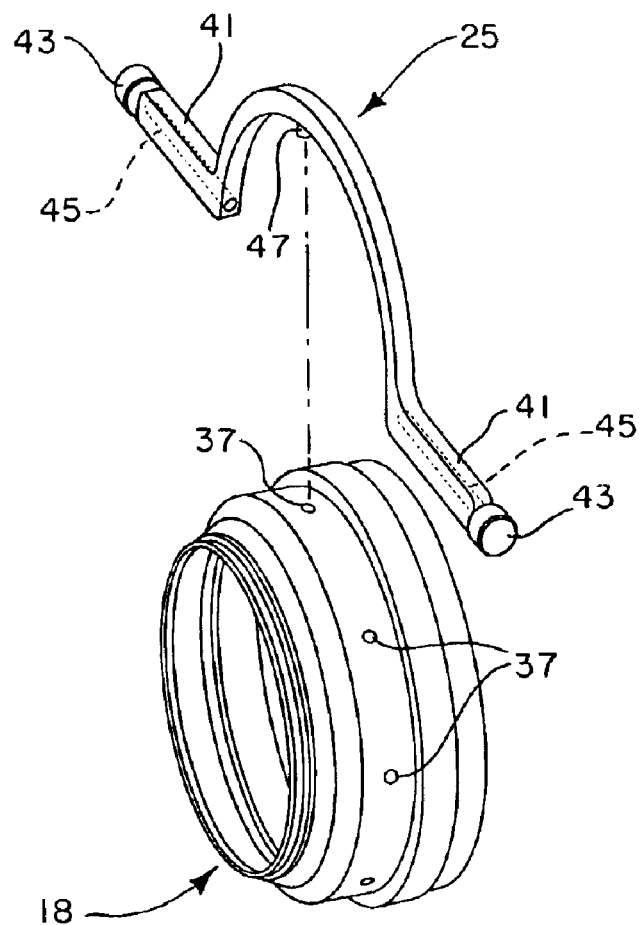
FIG. 9 shows an exploded perspective view of an outer member of the assembly of FIG. 1 and a spanner wrench that can be used to install and remove the outer member on and from an inner member of the assembly.

The cap 22 contains a series of, preferably eight, blind notches or slots 59 located in rotationally spaced apart relationship around an outer peripheral surface portion thereof. The slots 59 are rectangularly shaped and are open for entry from a side-facing the end wall 54. As shown in FIG. 7, a spanner wrench 61, having a semi-circular portion containing rotationally spaced apart rectangularly shaped pins 65 projecting from a concave side thereof and handles 63 projecting from opposite ends of the semi-circular portion, can be used to install and remove the cap 22 on and from the outer member 18. The pins 65 are aligned with and inserted into corresponding ones of the slots 59 and the handles can be rotated in the plane of the semi-circular portion to thread the cap 22 onto the outer member 18 or to remove the cap from the outer member following removal of the retainer ring 62. Again, during this procedure, the wrench 25 of FIG. 9 is used to stabilize the outer member 18 to prevent it from rotating as the cap 22 is rotated.

The seal ring assembly 36 of the present example comprises a pair of canted springs 74 disposed adjacent one another in a base portion of the groove 34. The assembly 36 further includes an optional metal expansion ring 76 (FIG. 1) disposed radially outwardly from the springs 74, axial end portions of which metal expansion ring are seated on axially and peripherally extending shoulders 78 (See FIG. 2c) in the opposing sidewalls of the groove 34. Finally, the assembly 36 includes a suitable filled plastic seal ring 80, such as a PTFE plastic, having a radially outwardly facing convex, spherically crowned surface 48 as previously indicated. As best seen in detail in FIGS. 2a, 2b and 2c, the concave surfaces 32 and 46 of outer member 18 and the intermediate member 20, respectively, are both very slightly spaced apart from the convex surface 28 of the inner member 16, as at a gaps 82a, 82b and 82c (gap 82, generally), so that only the spherically curved seal ring surfaces 39, 48 and 72 of the first, second and third seal ring assemblies 37, 36 and 58, respectively, slidably engage opposing spherically curved, seal receiving surfaces.

The first and second seal ring assemblies 37 and 58, respectively, are both of the compression type. The seal ring assembly 36 is of the expansion type. The first seal ring assembly 37 includes a suitable plastic seal ring 84, such as PTFE plastic, having the spherically concave surface 39 as previously explained. The ring 84 contains an L-shaped notch 86 (FIG. 2a) in a radially outer side surface portion in which a canted spring 88 is disposed in compression. In the assembled state as shown, the conforming threads and grooves 56, which adjoin the second end portion 38 of the outer member 18 with an interior threaded and grooved surface portion of the cap periphery 52, axially extend from the retainer ring groove 64 (FIG. 1) to a shoulder 90 (FIG. 2b) in an axial central portion of the leg 42. The peripheral wall 52 of the cap 22 defines an inwardly opening groove 92 (FIG. 2b) on and around an interior surface portion thereof. When the cap 22 is threaded tight onto the second end portion 38 to capture the ring assembly 58 and compress it against the shoulder 60, the groove 92 thus becomes positioned immediately next to the shoulder 90 as shown. The ring 58 can be formed from PTFE plastic. A conventional O-ring 94 is disposed in compression in and around the groove 92.

In typical operation, assume that compressed air enters the coupling 10 through either one of the conduits 12 or 14. In either case, a quantity of such air will enter the gap 82a, between the inner and outer members 16, 18, to the left of the first ring assembly 37, as viewed in FIGS. 1 and 1a. The first seal ring 84, with its concave surface 39 slidably bearing against the convex surface 28 of the inner member 16, will prevent passage thereacross of a sizable portion of the compressed air. However, as to any portion of such air which passes between the seal ring 84 and the underlying convex surface 28, such portion will proceed along the gap 82b, to the right of the first ring 84, as viewed, in FIGS. 2a and 2c, until it encounters the second seal ring 80. The seal ring 80, having its convex surface 48 slidably bearing against opposing portions of the concave surfaces 32 and/or 46, provides an effective seal to prevent most of the compressed air presented to the ring 80 from passing across it, to the right thereof, as viewed. Nevertheless, as to any amount of compressed air which crosses the ring 80, to the right thereof as viewed, into the gap 82c, such amount will seep through the air gap 96 (See FIG. 2b), thence through the opening 68 in the third seal ring assembly 58 to pressurize the ring interior 66 to, thus, expand the walls of the third ring so that pressurized air is largely prevented from escaping between the ring surface 72 and opposing convex surface 28 of the inner member 16 and out of the coupling 10 through the opening 55 in the cap end wall 54. Also, with the interior 66 of the second ring 58 filled with pressurized air, a radially outer wall of the ring 58 is urged against an opposing axial end portion of the leg 42 so that air flow through the gap 96 and thence between the ring 58 and the leg 42 in largely prevented. Finally, should some portion of the pressurized air entering the gap 96 pass between the second ring assembly 58 and the leg 42, thence around and between a free end of the leg 42 and the cap 22 and, finally, along and between a radially outer surface of the leg 42 and the cap periphery 52 to the groove 92, the O-ring 94 provides a fourth and final barrier to the leakage of compressed air from the coupling 10. It is believed that, under operating conditions, the air pressure in the gaps 82c and 96 will be in the neighborhood of one-half the air pressure in the gap 82a. In order to approximately balance the inwardly directed compression forces of the rings 84 and 58 on opposite sides of the outwardly directed expansion forced of the ring 80, the area of the bearing surface 72 of the ring 58 should be larger, preferably, about twice the area of the bearing surface 39 of the ring 84. Note the larger size of the ring 58 as compared with the ring 84 in FIG. 1.

The coupling 10 of the present example, is recommended for use in gaseous environments wherein the gas temperature typically does not exceed about 600° F. and wherein the gas pressure is typically not in excess of about 200 psi. As used herein, this temperature and pressure is considered the dividing line between high and low temperature environments and between high and low pressure environments, respectively. The convex and concave surfaces 28 and 32, respectively, are thus operatively movable relative to one another as a result of mechanical vibrations or otherwise about the common center point 31 of FIG. 1. The center of the outwardly opening groove 34 is also located at the center point 31. Finally, the inwardly opening groove 35 and the groove containing the ring assembly 58 are parallel, spaced apart and in registry with one another with their common center line, as at 33 in FIG. 1, always intersecting the center point 31 for all operative orientations of the convex and concave surfaces 28 and 32 relative to one another.

Figure 3:
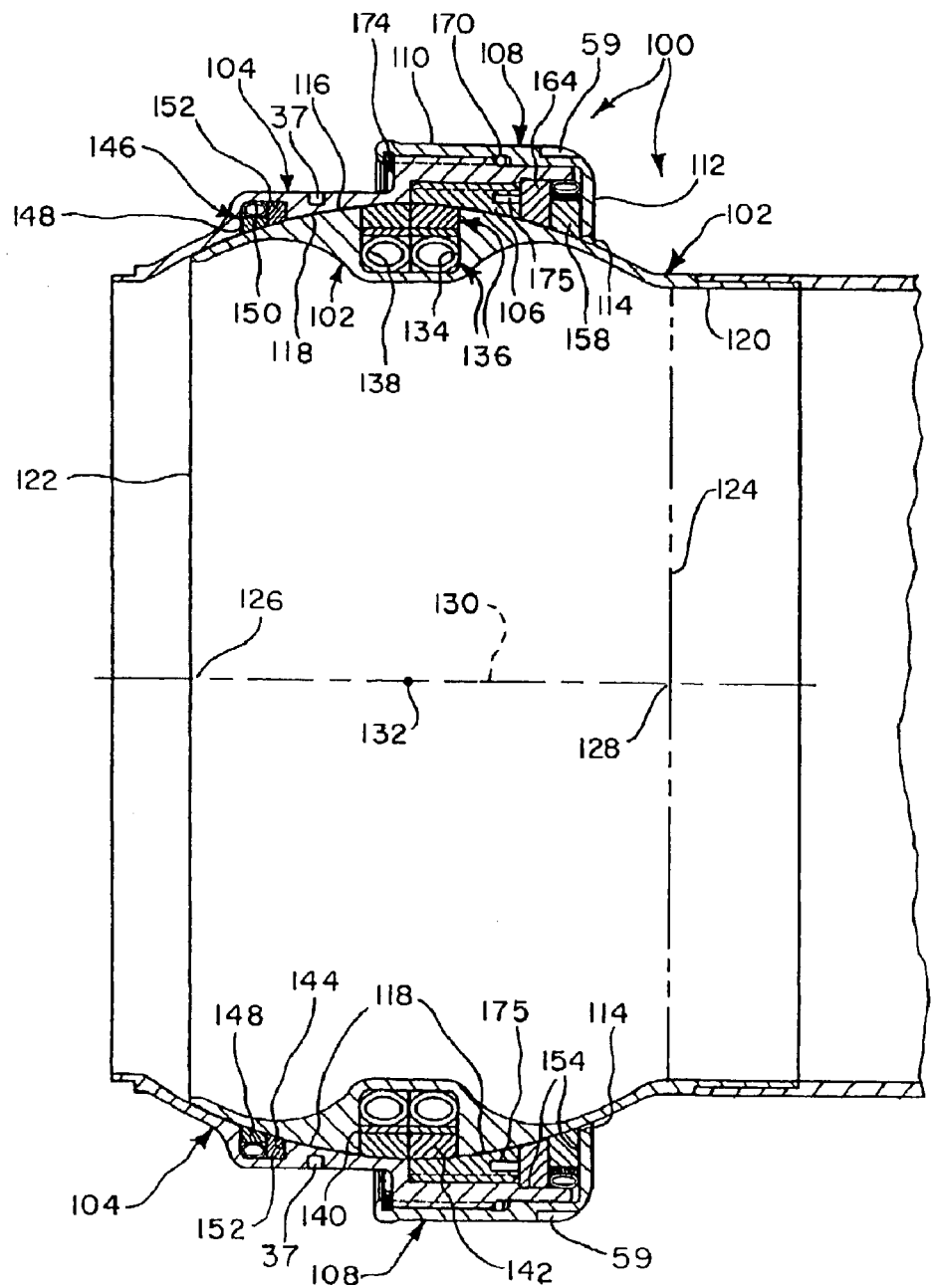
FIG. 3 shows a cross-sectional side elevation view of a flexible coupling for joining a pair of conduits for transfer of a gas, under pressure, between the conduits, thus illustrating another important embodiment of the present invention.
Figures 4A, 4B:
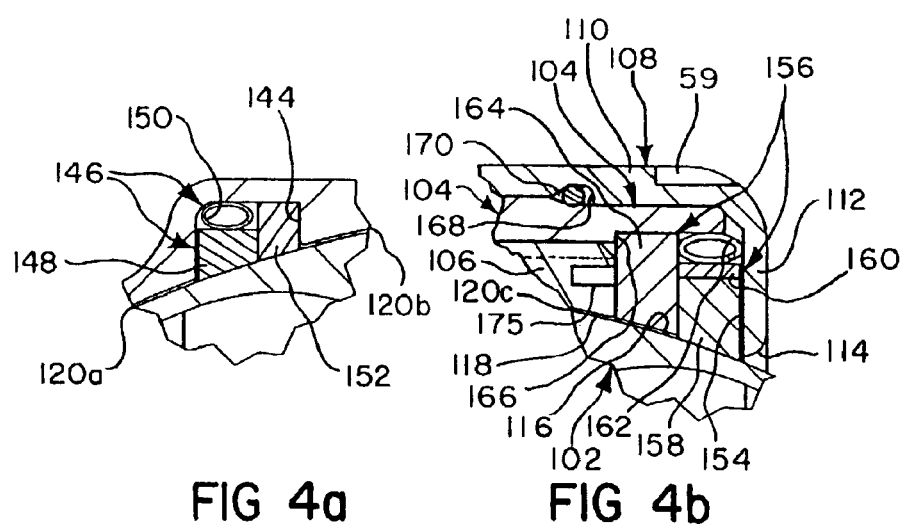
FIGS. 4a, 4b, and 4c show enlarged detail views of three spring biased, gas pressure energized gas seal ring assemblies used in the coupling of FIG. 3.

Referring now to FIGS. 3 and 4a, b and c there is shown, in another important embodiment of the present invention, a flexible coupling, generally designated 100, including, as before, a hollow, annular inner member, generally designated 102, a hollow annular outer member, generally designated 104 (which includes an annular intermediate member 106) and an annular end cap, generally designated 108, defining a peripheral skirt 110 and an end wall 112 containing a circular central opening 114. As in the previous example, the inner member 102 defines a radially outwardly facing, spherically curved, convex seal receiving surface 116 and the outer member 104 (together with the intermediate member 106 in combination) define a radially inwardly facing, spherically curved, concave seal receiving surface 118. The surfaces 116 and 118 closely conform to each other in curvature and are closely spaced apart as indicated by gaps 120a, b and c (120 generally) in FIGS. 4a, b, and c.

As in the previous example, the convex surface 116 occupies a first end portion of the inner member 102 while a second end portion 120 of the inner member is adapted for connection to a first conduit as by welding or other suitable means. The inner member 102 defines first circular openings 122 and 124 which are parallel with and opposite one another across the convex surface 116. The radial centers 126, 128 of the openings 122 and 124, respectively, are joined by a centerline 130 which extends through a center point 132 of the convex surface 116. The center point 132 is also the center of the concave surface 118 for all operative orientations of the two surfaces under and over one another. These features are also present in the assembly 10 of FIGS. 1 and 1a.

The inner member 102 defines a radially outwardly opening groove 134 containing an expansion type ring assembly, generally designated 136. The radial center of the groove 134 is also at the center 132 of the inner and outer members 102 and 104. The assembly 136 includes a pair of expansion springs 138 disposed in a base of the groove 134, a pair of expansion rings 140 and a pair of seal rings 142 which project out of the groove 134 into gas sealing engagement with the concave surface 118 of the outer member 104, including, in combination, the intermediate member 106. The gas sealing or bearing surfaces of the rings 142 are spherically crowned in conformity with the concave surface 118.

The concave surface 118 of the outer member 104 is also centered on the point 132 so that the convex surface 116 and concave surface 118 are always centered on the same center point 132, regardless of their movement and orientation relative to one another. The outer member 104 defines a first inwardly opening groove 144 in which is disposed a first compression type seal ring assembly, generally designated 146. The assembly 146 includes a first compression ring 148 which is biased radially inwardly against the convex surface 116 by a spring 150. The ring 148 includes a concave bearing surface which engages the convex surface 116. The assembly 146 also includes a second seal ring 152 which has a concave bearing surface which bears upon the convex surface 116.

Figures 4C, 4D:
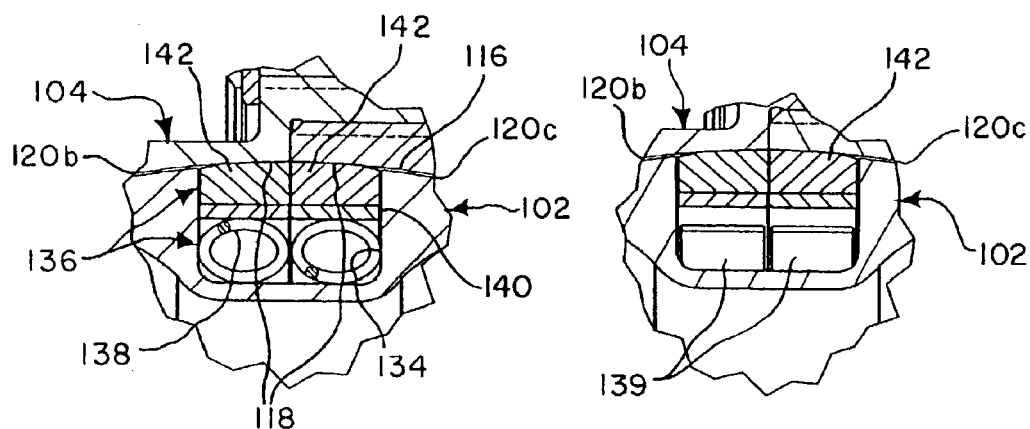
FIG. 4d shows an enlarged detail view of a gas seal ring assembly that can be substituted in place of one of the seal ring assemblies of FIGS. 3 and 4c.

The cap 108 is mounted over the convex surface 116 so that the end wall 112 encloses an end of the outer member 104 and a corresponding end of the intermediate member 106 to define a second inwardly opening ring assembly groove 154. The end wall 112 contains a circular central opening 114 through which the inner member 104 extends. As shown in FIG. 4b, the groove 154 contains a second compression type spring biased and gas pressure energized seal ring assembly, generally designated 156. The assembly 156 includes a first spring biased seal ring 158, a compression ring 160 and a spring 162.The assembly 156 also includes a second seal ring 164 which projects from the groove 154 and fits against a shoulder or ledge 166 formed in a radially inwardly facing side of an end portion of the outer member 104. See FIG. 4b. The groove 154 is thus defined by the cap end wall 112, an end portion of the outer member 104, an end of the intermediate member 106 and the convex surface 116. A peripheral slot 168 is formed in and around an interior surface portion of the cap periphery 110 in which is disposed a metallic non-gas pressure energized seal ring 170. The cap 108 may be threadably secured to the outer member 104 and, likewise, the member 104 to the interior member 106, the same as in the previous example. A retainer ring 174 is removably mounted in a groove located on an interior end portion of the cap periphery 110 of the cap 108. The seal ring assemblies 136, 146 and 156 of the present example are adapted to function typically at temperatures up to about 1200° F. and at gas pressures up to about 1200 psi. The seal rings 148, 152, 142, 158 and 164 can be constructed of materials such as nickel alloys, corrosion resistant steel, inconel and the like. FIG. 4d shows the same ring assembly as at 136 in FIG. 4c, except that a pair of conventional Marcel springs 139 is substituted in place of canted springs 138.

Figure 5:
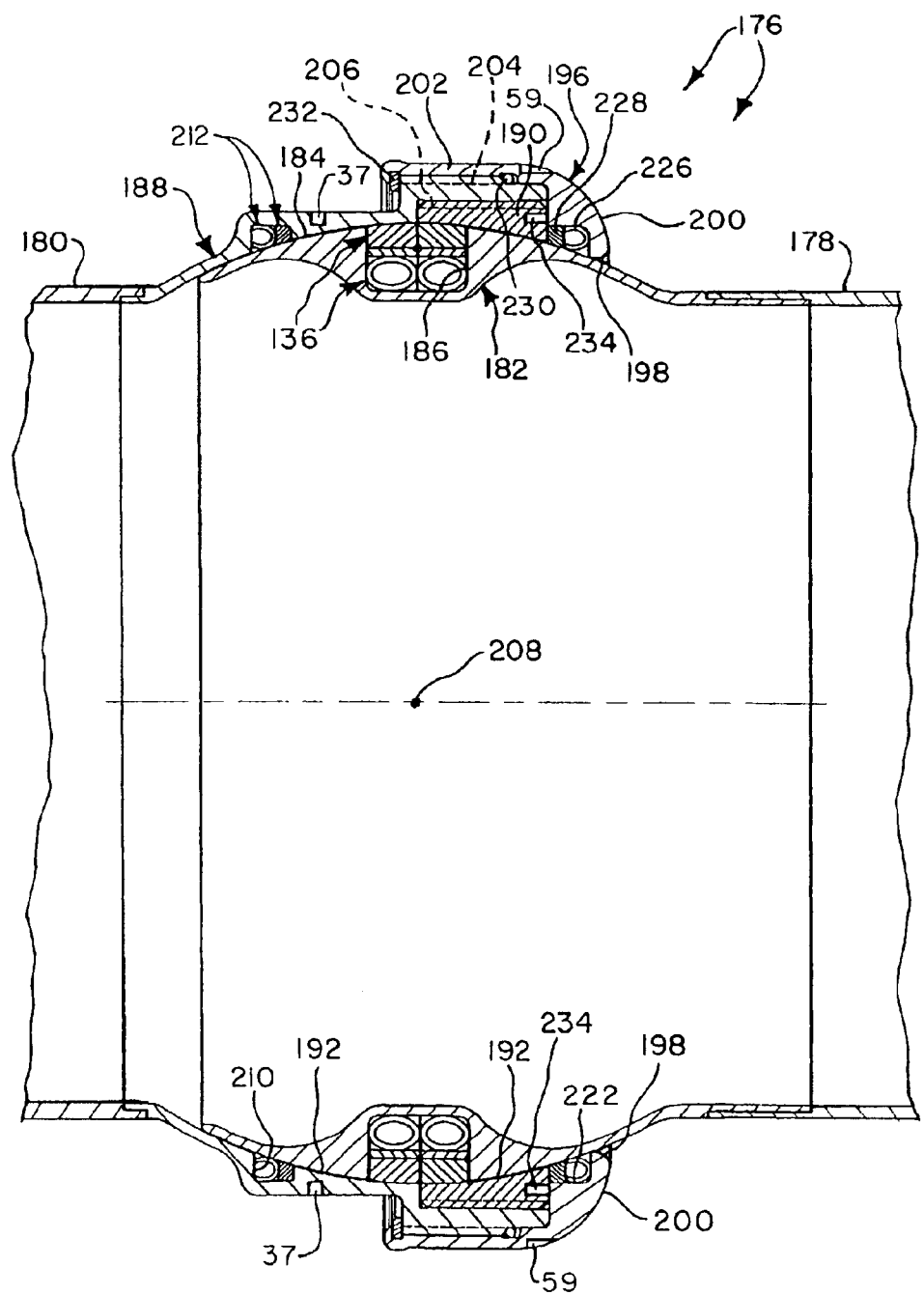
FIG. 5 shows a cross sectional side elevation view of a flexible coupling joining a pair of conduits for transfer of a gas, under pressure, between the conduits, thus illustrating yet another important embodiment of the present invention.
Figures 6A, 6B:
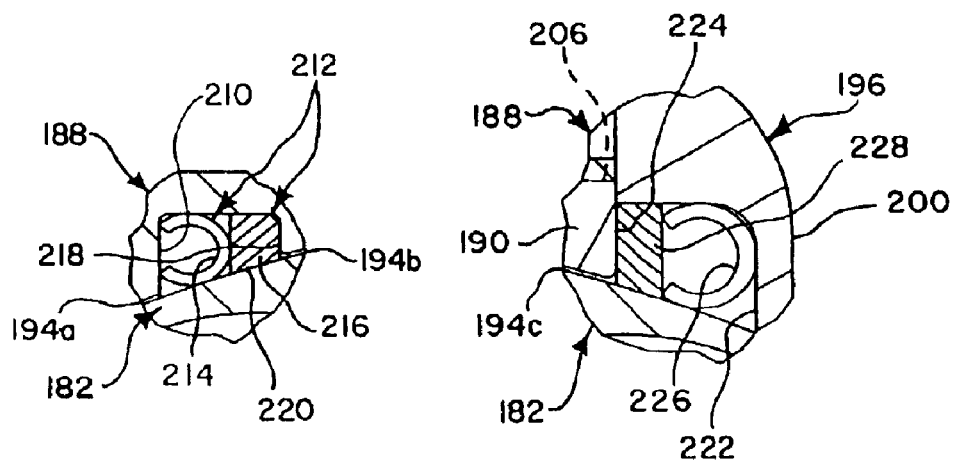
FIGS. 6a, 6b and 6c show enlarged detail views of three different gas seal ring assemblies used in the coupling of FIG. 5.
Figure 6C:
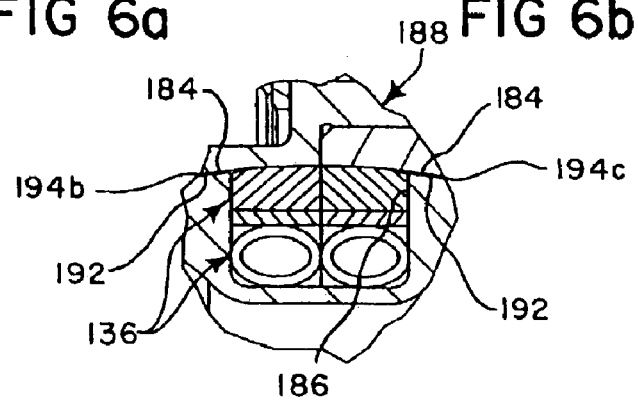

Referring now to FIGS. 5 and 6a, b and c there is shown, in another important embodiment of the present invention, a flexible coupling, generally designated 176, for transferring a compressed gas between a pair of conduits 178, 180. A body of the coupling 176 includes essentially the same three component parts as in the previous examples, namely, a hollow annular inner member, generally designated 182, defining a radially outwardly facing, spherically curved, convex, seal receiving surface 184 and a radially outwardly opening ring assembly retainer groove 186. The coupling 176 also includes a hollow annular outer member, generally designated 188, which also includes a threadably interconnected annular intermediate member 190, which cooperate with each other to define a radially inwardly facing, spherically curved, concave, seal receiving surface 192. As before, the convex and concave surfaces 184 and 192 closely conform in curvature and are closely spaced apart in general opposition to each other as indicated by small gaps 194a, b and c (194 generally) in FIGS. 6a, b and c. As in the previous examples, the gap 194 between the convex and concave surfaces 184 and 192 should preferably, be from about 0.005 to 0.010 inches in width. Thirdly, the coupling 176 includes a locking or end cap, generally designated 196, defining a circular central opening 198 in an end wall 200 which permits the end cap to mount over the inner member 182. The cap 196 also contains a peripheral skirt 202 which can be threadably interconnected over and to the outer member 188, the threading being represented by dashed lines 204 in FIG. 5. The outer member 188 can also be threadably interconnected with the intermediate member 190 as represented by dashed lines 206 in FIG. 5. The convex surface 184 and the concave surface 192 are movable relative to one another about a common center point 208.

The groove 186 includes the same ring assembly 136 as is disposed in the groove 134 of the previous example. The outer member 188 defines a first inwardly opening seal ring assembly retaining groove 210 containing a first compression type, gas pressure energized gas seal ring assembly 212. The assembly 212 includes a gas pressure energized seal ring 214 of a C-shaped cross-section next to a metal seal ring 216. As shown in FIG. 6a, high pressure gas entering the gap 194a enters the ring 214 to expand the same and force the seal ring 216 against an opposite wall 218 of the groove 210. The seal ring 216 includes spherically curved, concave bearing surface 220 which is also forced into tighter engagement with the opposing convex surface of the inner member 182 as the pressure energized ring 214 expands.

Placement of the cap 196 over the inner and outer members 182 and 188, respectively, causes a second radially inwardly opening seal ring assembly retaining groove 222 to be formed as best seen in FIG. 6b. The groove 222 is thus bounded by the cap end wall 200, the convex surface 184 (FIG. 5) of the inner member 182 and an end wall 224 (FIG. 6b) of the intermediate member 190. High pressure gas entering the groove 222 through the gap 194c causes a gas pressure energized ring 226 of C-shaped cross section to open to force a compression type seal ring 228 against the end wall 224 to prevent gas from escaping between opposing surfaces of the end wall 224 and the ring 228. As in the previous example, a metallic non-pressure energized seal ring 230 is captured in an annular groove formed in an interior peripheral wall portion of the cap skirt 202. See FIG. 5. A retainer ring 232 is removably positioned in a radially inwardly opening groove in an end portion of the skirt 202. The seal ring assemblies 136, 212 and 226, 228 of the present example are also adapted for use in temperatures typically up to about 1200° F. and gas pressure, up to about 1200 psi.

Figure 1A:
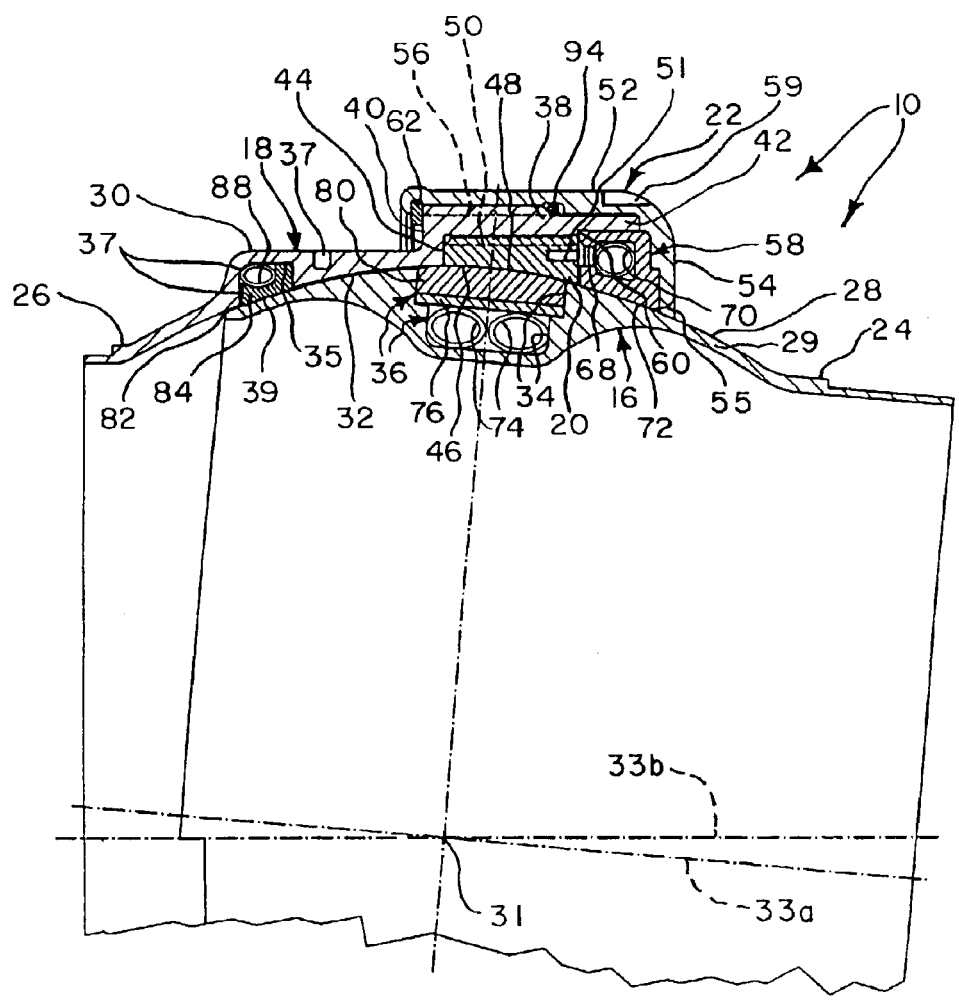
FIG. 1a shows a partial cross-sectional side elevation view of the coupling and conduits of FIG. 1, wherein the conduits are angulated relative to each other.
Figures 2A, 2B:
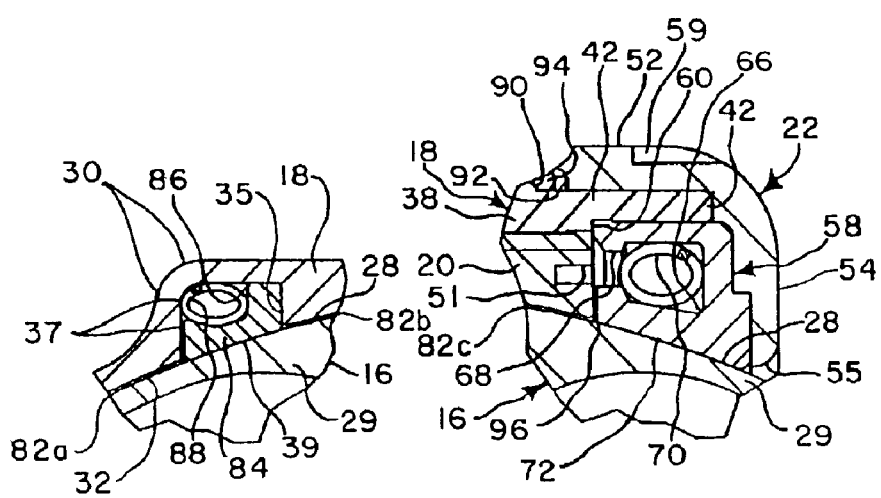
Figure 2C:
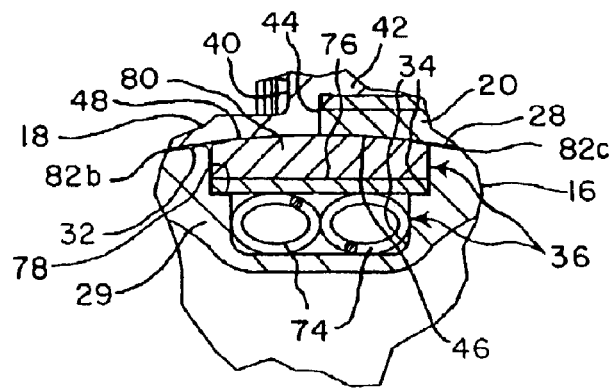

Referring again to the coupling 10 of FIGS. 1 and 1a as being typical of the three examples of the invention disclosed herein, the maximum angle between the center line 33a of the member 16 and conduit 12, on one hand, and the intersecting center line 33b of the member 18 and conduit 14, on the other hand, referred to as "angulation", can be at least five degrees in any direction. As previously mentioned, the ring assemblies 36, 37 and 58 and the O-ring 94 can be replaced without having to remove the coupling 10 from the conduits 12 and 14 according to the following procedure:

First, the retaining ring 62 is removed from the cap groove 64 and allowed to hang loosely, for the time being, around the member 18 or the adjoining conduit 14.

Second, using the spanner wrench 61 of FIG. 7 and with its pins 65 located in aligned ones of the cap notches 59, the cap 22 is rotated to threadably disconnect it from the member 18 while the spanner wrench 25 of FIG. 9, with its retractable pins 45 extending so that the pins 45 and 47 are inserted into aligned ones of the blind holes 37 of the member 18, is used to hold the member 18 stationary. Upon disconnection, the cap 22 is removed from around the convex surface, to the right as viewed, and hung loosely around the conduit 12 so as to be out of the way.

Third, the old O-ring 94 can be removed from the cap groove 92 (FIG. 2b) and the now exposed old ring assembly 58 can be pulled away from the convex surface 28 toward the conduit 12. The old O-ring 94 and ring assembly 58 can each be cut into two pieces for removal and discarding.

Fourth, using the spanner wrench 25 to hold the outer member 18 stationary, as in the second step and also using the spanner wrench 53 of FIG. 8 and with its pins 57 inserted in aligned ones of the blind holes 51 of the intermediate member 20, the member 20 is rotated to threadably disconnect it from the leg 38 of the member 18. Upon disconnection, the member 20 is also removed from around the convex surface 28, to the right as viewed, and placed loosely over the conduit 12, to the left of and next to the cap 22.

Fifth, the members 16 and 18 are separated by pulling them apart, to the right and left respectively, as viewed. Upon removal of the ring assembly 37 from engagement with the convex surface 28, to the left as viewed, the ring assembly can be removed from the groove 35 and discarded.

Sixth, with the outer member 18 removed to the left, as viewed, from the inner member 16, the now exposed ring assembly 36 can be dug, pried or otherwise removed from the groove 36 and, if necessary, cut into two pieces and discarded.

Having thus removed the old ring assemblies and the O-ring from the now disassembled coupling 10, new ones of the assemblies and a new O-ring can now be installed as follows:

First, with the members 16 and 18 pulled apart, to the right and left, respectively, as viewed, to open a gap between them, the new O-ring 94 is applied over the member 16 and is installed in the cap groove 90. See FIG. 2b. The new ring 58, without spring 66, is then introduced into the gap between the members 16 and 18. The ring 58, so introduced, can be tilted so that a semi-circular portion thereof can be slid along the outwardly expanding portion of the convex surface 28 until it drops, in a tilted manner, into the now empty central ring groove 34. Thereafter, the remaining semi circular portion of the ring 58 is moved over an opposing portion of the convex surface 28 until the ring is fully and loosely disposed in the groove 34. Then, by pushing a lower portion of the ring 58 upwardly into a corresponding lower portion of the groove 34 so that an upper portion of the ring projects out of an upper portion of the groove, the upper ring portion can be tilted, to the right as viewed, over the inwardly contracting portion of the convex surface 28. Thereafter, the upper ring portion is permitted to drop against the convex surface 28 to allow the lower ring portion to project out of the lower portion of the groove 34 so that the lower ring portion can be moved along the opposing inwardly contracting portion of the surface 28 for placement of the ring loosely on the conduit 12, to the left of the member 20, as viewed.

Second, the spring 66 is now introduced into the gap between the members 16 and 18 and is moved over the convex surface 28 to a position next to and on the left side of the ring 58.

Third, the ring assembly 36 is introduced into the gap between the members 16 and 18 and placed in the groove 34 with the springs 74 being placed first, the expansion ring 76, if used, next, followed by the seal ring 80. The ring 76, being a cut ring, permits opening of the ring as necessary to apply it over the convex surface 28 into the groove 34. The seal ring 80, if cut, can, likewise, be opened to facilitate placement in the groove 34. If the ring 80 is not cut or split, since it is constructed of a flexible plastic, it can be stretched sufficiently to slide over the surface 28 into the groove 34. If the ring 80 is an uncut plastic ring, the expansion ring 76 may or may not be used.

Fourth, with the ring groove 35 of the member 18 being clear of the convex surface 28, the ring assembly 37 is installed in the groove 35, whereupon the members 16 and 18 are partially, but almost completely, rejoined by hand to place the ring assembly 37 over and into engagement with the surface 28.

Fifth, the intermediate member 20 is lifted off of the conduit 12 and moved to the left, as viewed, while the ring 58, followed by the spring 66, are separately passed through the intermediate member, to be placed on the right side thereof, as viewed, with the spring still to the left of the ring.

Sixth, the spring 66 is now inserted into the ring 58.

Seventh, the spanner wrench 53 of FIG. 8 is used to rejoin the intermediate member 20 to the leg 38 of the member 18 while the spanner wrench 25 of FIG. 9 is used to hold the outer member stationary. Rejoinder of the member 20 with the member 18 should complete any small misjoinder between the members 16 and 18 that may have existed following the fourth step.

Eighth, using the spanner wrench 61 of FIG. 7, the cap 22 is rotated over and rejoined to the outer member 18, while the spanner wrench 25 of FIG. 9 is used to hold the outer member stationary, thus bringing the ring 58 into proper position under the outer leg 42 and against the shoulder 60 (FIG. 2b).

Ninth, the retainer ring 62 is reinstalled in the cap groove 64.

Accordingly, by this procedure, the ring assemblies 36, 37 and 58 and the O-ring 94 can be removed and replaced without the necessity of removing the coupling from connection to the conduits 12 and 14 for being disassembled and reassembled at a remote work station. The retainer ring 62 now prevents the cap 22 from decoupling from the outer member 18 which might otherwise occur due to vibration, thermal expansion or contraction or the like during in-service operation of the assembly 10.

Although the present invention has been described with respect to specific details of a certain preferred embodiment and other important embodiments thereof, it is not intended that such details limit the scope and coverage of this patent other than as specifically set forth in the following claims, taking into consideration reasonable equivalents thereof.

I claim:

1. A flexible coupling for transferring a pressurized gas between a first conduit and a second conduit comprising:

a hollow annular inner member defining a spherically curved, convex, seal receiving surface and an annular seal ring assembly retainer groove which opens outwardly on said convex surface;

a hollow annular outer member mounted over said inner member and defining a spherically curved, concave seal receiving surface which conforms to and which is spaced from said convex surface, said convex surface and said concave surface being movable relative to one another about a common center point, said outer member further defining a first annular seal ring assembly retainer groove which opens inwardly on said concave surface in opposition to said convex surface;

an annular end cap being connected to said outer member and having an end wall which encloses one end of said outer member and which, in combination with said outer member, defines a second annular seal ring assembly retainer groove which opens inwardly in opposition to said convex surface;

a series of seal ring assemblies, a different one of said assemblies being disposed in each said groove, each of said assemblies including at least one seal ring which projects out of a corresponding one of said grooves and which contains a bearing surface which conforms to and which engages an opposing one of said seal receiving surfaces; and wherein said seal ring assembly retainer groove that opens outwardly on said convex surface is located in between said first and second annular seal ring assembly retainer grooves that open inwardly in opposition to said convex surface.

2. The coupling of claim 1 wherein said inner member comprises a first open end portion adapted for attachment to said first conduit and a second open end portion defining said convex surface, said outer member comprising a first open end portion adapted for attachment to said second conduit and a second open end portion defining said concave surface.

3. The coupling of claim 1 wherein said outer member is removably mounted over said inner member.

4. The coupling of claim 1 wherein said end cap contains an end wall defining a circular central opening, said end cap being removably mounted over said inner member and being removably connected to said outer member.

5. The coupling of claim 1 wherein said outer member comprises a first part and a second part which is separate from and removably connected to said first part, said first part and said second part, in combination, defining said concave surface when operatively connected.

6. The coupling of claim 1 wherein said convex surface comprises a portion of a sphere having open opposite ends which are essentially parallel with one another, said outwardly opening groove being centered on said center point and being positioned so as to be essentially parallel to and axially equidistant from said open opposite ends.

7. The coupling of claim 1 wherein said end cap is removably threadably connected to said outer member.

8. The coupling of claim 1 further comprising a retaining ring removably connected in an open end portion of said end cap for preventing separation of said outer member from said end cap.

9. The coupling of claim 1 wherein said end cap includes a peripheral wall which is interiorly threaded and tapped, an outer peripheral surface portion of said outer member being exteriorly threaded and tapped, said peripheral wall and said peripheral surface portion being removably threadably interconnected.

10. The coupling of claim 1 further comprising an O-ring being disposed between said end cap and said outer member.

11. The coupling of claim 1 wherein said outwardly opening groove is centered on said center point and wherein said first and second grooves are parallel to and in registry with one another and have a common centerline which intersects said center point for all operative orientations of said convex surface relative to said concave surface.

12. The coupling of claim 1 wherein one of said assemblies disposed in said first groove comprises:
   a first gas seal ring defining an annular notch in a high gas pressure axial side portion and in an outer peripheral surface portion thereof; and
   a first radially compressed and expansible canted spring disposed in said notch for providing a minimum seal on a low gas pressure side of said seal ring against an opposing sidewall of said first groove, said spring also providing a minimum seal of the bearing surface of said first seal ring upon said convex surface.

13. The coupling of claim 1 wherein said outer member comprises a first part and a second part which cooperate to form said concave surface, said second part being disposed between said convex surface and a leg of said outer member, said second part being removably and threadably connected to an inner surface portion of said leg, said cap being removably and threadably connected to an outer surface portion of said leg.

14. The coupling of claim 1 wherein said convex surface forms a portion of a sphere having opposite open ends which are parallel to one another, said outwardly opening groove being centered on said center point and being parallel to and equidistant between said open ends.

15. The coupling of claim 1 wherein said seal ring assemblies each comprise at least one spring biased, gas pressure energized gas seal ring.

16. The coupling of claim 1 wherein one of said assemblies which is disposed in said first groove comprises a first gas pressure energized gas seal ring defining a peripherally extending notch in a high gas pressure outer side portion thereof and an annular canted spring disposed in said notch for biasing said first ring toward a gas sealing position against a low pressure side portion of said first groove and against said convex surface.

17. The coupling of claim 1 wherein said outwardly opening groove on said convex surface defines annularly extending ledges on opposite sides thereof, one of said assemblies which is disposed in said outwardly opening groove comprising a pair of canted biasing springs disposed beside one another in a base of said outwardly opening groove and a second PTFE plastic gas seal ring having a spherically crowned convex bearing surface conforming to and engaging said concave surface, said second ring being seated in said outwardly opening groove on said ledges.

18. The coupling of claim 1 wherein one of said seal ring assemblies which is disposed in said second groove comprises a third gas pressure energized gas seal ring having a generally C-shaped radial cross-section defining a hollow annular interior having an opening facing a radially inner end portion of said outer member and further comprising a canted biasing spring disposed in said interior for urging three sides of said third ring into gas sealing engagement with opposing sides of said outer member, said convex surface and said end cap, said outer member defining a shoulder against which said third seal ring bears for providing a gas leakage gap between a side of said outer member and an opposing side of said third ring which contains said opening, said gas leakage gap being in communication with a space between said convex surface and said concave surface through which a pressurized gas can be introduced to gas energize said third ring.

19. The coupling of claim 1 wherein opposing portions of said convex surface and said concave surface are spaced apart by said seal ring assemblies by a distance in a range of from about 0.005 inches to about 0.010 inches.

20. The coupling of claim 1 wherein an area of the bearing surface of the seal ring contained in said second groove is greater than an area of the bearing surface of the seal ring contained in said first groove.

21. The coupling of claim 1 wherein said outwardly opening groove is centered on said center point, said first and second grooves being parallel and in registry with each other and having a common center line which intersects said center point for all operative orientations of said convex surface relative to said concave surface.

22. The coupling of claim 1 wherein one of said assemblies which is disposed in said second groove comprises a third pair of seal rings, a compression ring mounted over one of said third pair of rings which is located on a low pressure side of said second groove and a biasing spring which is located between said compression ring and a base of said second groove, both of said third pair of seal rings forming, in combination, a single, continuous concave bearing surface which conforms to and engages said convex surface.

23. The coupling of claim 1 wherein one of said assemblies which is disposed in said first groove comprises a C-ring disposed in a high pressure side of said second groove and a first seal ring disposed next to said C-ring in a low pressure side of said second groove, said C-ring opening toward a high pressure side of said second groove.

24. The coupling of claim 1 wherein one of said assemblies which is disposed in said second groove comprises a third seal ring disposed in a high pressure side of said second groove and a C-ring disposed in a low pressure side of said second groove, said C-ring opening toward said third seal ring.

25. The coupling of claim 1 wherein one of said assemblies which is disposed in said first groove comprises a first pair of seal rings and a biasing spring located between one of said first pair of rings which is located on a high pressure side of said first groove and a base of said first groove.

26. The coupling of claim 1 wherein one of said assemblies which is disposed in said outwardly opening groove comprises a pair of biasing springs disposed in a base of said outwardly opening groove, a pair of expansion rings disposed over said biasing springs and a second pair of seal rings disposed over said expansion rings, both of said second pair of seal rings having crowned bearing surfaces which, in combination, form a single, continuous convex surface which conforms to and engages said surface.

27. The coupling of claim 5 wherein said second part is disposed between said convex surface and an axial end portion of said first part, opposing surface portions of said first part and said second part being conformingly threaded and tapped so as to be removably threadably interconnected.

28. The coupling of claim 5 wherein said first part, said second part and said end cap cooperate to define said second groove.

29. The coupling of claim 6 wherein said concave surface comprises a portion of a sphere having open opposite ends, axially central planes of said first groove and said second groove being parallel to each other and, when said convex surface and said concave surface are in one position relative to one another wherein all of said grooves are essentially parallel to one another, said outwardly opening groove is between and equidistant from said first groove and said second groove.

30. The coupling of claim 14 wherein said first groove and said second groove are parallel to and in registry with one another and have a common center line which intersects said center point.

31. The coupling of claim 20 wherein the bearing surface area of the seal ring contained in said second groove is about twice the surface area of the seal ring contained in said first groove.

32. The flexible coupling of claim 1 wherein said first and second annular seal ring assembly retainer grooves that open inwardly have a central axis and are co-axial with each other.

33. The flexible coupling of claim 1 wherein said first and second annular seal ring assembly retainer grooves that open inwardly are oriented substantially parallel to each other.

34. A flexible coupling for transferring a pressurized gas between a first conduit and a second conduit comprising:

a hollow annular inner member defining a spherically curved, convex, seal receiving surface and an annular seal ring assembly retainer groove which opens outwardly on said convex surface;

a hollow annular outer member mounted over said inner member and defining a spherically curved, concave, seal receiving surface which closely conforms to and which is closely spaced from at least a portion of said convex surface, said convex surface and said concave surface being movable relative to one another about a common center point, said outer member further defining a first annular seal ring assembly retainer groove which opens inwardly on said concave surface in opposition to said convex surface;

an annular end cap being connected to said outer member and having an end wall which encloses one end of said outer member and which, in combination with said outer member, defines a second annular seal ring assembly retainer groove which opens inwardly in opposition to said convex surface, said outwardly opening groove being centered on said center point, said first and second grooves being parallel to and spaced apart from one another and having common center line which intersects said center point for all operative orientations of said convex surface relative to said concave surface; and a series of seal ring assemblies, different one of said assemblies being disposed in each said groove, each of said assemblies including at least one gas seal ring which projects out of a corresponding one of said grooves and which contains a spherically shaped bearing surface which conforms to and which engages an opposing one of said seal receiving surfaces.

35. A flexible coupling for transferring a pressurized gas between a first conduit and a second conduit comprising:

a hollow annular inner member defining a spherically curved convex seal receiving surface;

a hollow annular outer member mounted over said inner member and defining a spherically curved concave seal receiving surface which conforms to and which is spaced from said convex surface, said concave surface and said convex surface being movable relative to one another about a common center point, one of said members defining a first annularly extending seal ring assembly retainer groove which opens toward an opposing one of said surfaces and which is centered on said center point, the other of said members defining a second and at least partially defining a third seal ring assembly retainer groove, said second and third ring assembly retaining grooves being parallel to, in registry with and spaced apart from one another such that a center line extending between centers of said second and third grooves always intersects said center point regardless of the operative orientation of said members relative to one another;

an annular end cap having a peripheral skirt and an end wall defining a circular central opening, said end cap being disposed over said inner member and being connected to said outer member such that said end wall encloses one end of said outer member; and a series of seal ring assemblies, a different one of said assemblies being disposed in each of said grooves, each of said assemblies including at least one seal ring which projects out of a corresponding one of said grooves and which contains a spherically shaped bearing surface which conforms to and engages an opposing one of said seal receiving surfaces.

36. The coupling of claim 35 wherein the one of said members which defines said first groove comprises said inner member.

37. A flexible coupling for transferring a pressurized gas between a first conduit and a second conduit comprising:

a hollow annular inner member defining a spherically curved, convex, seal receiving surface and an annular seal ring assembly retainer groove which opens outwardly on said convex surface;

a hollow annular outer member mounted over said inner member and defining a spherically curved, concave seal receiving surface which conforms to and which is spaced from said convex surface, said convex surface and said concave surface being movable relative to one another about a common center point, said outer member further defining a first annular seal ring assembly retainer groove which opens inwardly on said concave surface in opposition to said convex surface;

an annular end cap being connected to said outer member and having an end wall which encloses one end of said outer member and which, in combination with said outer member, defines a second annular seal ring assembly retainer groove which opens inwardly in opposition to said convex surface;

a series of seal ring assemblies, a different one of said assemblies being disposed in each said groove, each of said assemblies including at least one seal ring which projects out of a corresponding one of said grooves and which contains a spherically shaped bearing surface which conforms to and which engages an opposing one of said seal receiving surfaces; and wherein said convex surface comprises a portion of a sphere having open opposite ends which are essentially parallel with one another, said outwardly opening groove being centered on said center point and being positioned so as to be essentially parallel to and axially equidistant from said open opposite ends.

38. A flexible coupling for transferring a pressurized gas between a first conduit and a second conduit comprising:

a hollow annular inner member defining a spherically curved, convex, seal receiving surface and an annular seal ring assembly retainer groove which opens outwardly on said convex surface;

a hollow annular outer member mounted over said inner member and defining a spherically curved, concave seal receiving surface which conforms to and which is spaced from said convex surface, said convex surface and said concave surface being movable relative to one another about a common center point, said outer member further defining a first annular seal ring assembly retainer groove which opens inwardly on said concave surface in opposition to said convex surface;

an annular end cap being connected to said outer member and having an end wall which encloses one end of said outer member and which, in combination with said outer member, defines a second annular seal ring assembly retainer groove which opens inwardly in opposition to said convex surface;

a series of seal ring assemblies, a different one of said assemblies being disposed in each said groove, each of said assemblies including at least one seal ring which projects out of a corresponding one of said grooves and which contains a spherically shaped bearing surface which conforms to and which engages an opposing one of said seal receiving surfaces; and wherein said end cap is removably threadably connected to said outer member.

39. A flexible coupling for transferring a pressurized gas between a first conduit and a second conduit comprising:

a hollow annular inner member defining a spherically curved, convex, seal receiving surface and an annular seal ring assembly retainer groove which opens outwardly on said convex surface;

a hollow annular outer member mounted over said inner member and defining a spherically curved, concave seal receiving surface which conforms to and which is spaced from said convex surface, said convex surface and said concave surface being movable relative to one another about a common center point, said outer member further defining a first annular seal ring assembly retainer groove which opens inwardly on said concave surface in opposition to said convex surface;

an annular end cap being connected to said outer member and having an end wall which encloses one end of said outer member and which, in combination with said outer member, defines a second annular seal ring assembly retainer groove which opens inwardly in opposition to said convex surface;

a series of seal ring assemblies, a different one of said assemblies being disposed in each said groove, each of said assemblies including at least one seal ring which projects out of a corresponding one of said grooves and which contains a spherically shaped bearing surface which conforms to and which engages an opposing one of said seal receiving surfaces; and wherein said outer member comprises a first part and a second part which cooperate to form said concave surface, said second part being disposed between said convex surface and a leg of said outer member, said second part being removably and threadably connected to an inner surface portion of said leg, said cap being removably and threadably connected to an outer surface portion of said leg.

40. A flexible coupling for transferring a pressurized gas between a first conduit and a second conduit comprising:

a hollow annular inner member defining a spherically curved, convex, seal receiving surface and an annular seal ring assembly retainer groove which opens outwardly on said convex surface;

a hollow annular outer member mounted over said inner member and defining a spherically curved, concave seal receiving surface which conforms to and which is spaced from said convex surface, said convex surface and said concave surface being movable relative to one another about a common center point, said outer member further defining a first annular seal ring assembly retainer groove which opens inwardly on said concave surface in opposition to said convex surface;

an annular end cap being connected to said outer member and having an end wall which encloses one end of said outer member and which, in combination with said outer member, defines a second annular seal ring assembly retainer groove which opens inwardly in opposition to said convex surface;

a series of seal ring assemblies, a different one of said assemblies being disposed in each said groove, each of said assemblies including at least one seal ring which projects out of a corresponding one of said grooves and which contains a spherically shaped bearing surface which conforms to and which engages an opposing one of said seal receiving surfaces; and wherein said seal ring assemblies each comprise at least one spring biased, gas pressure energized gas seal ring.

41. A flexible coupling for transferring a pressurized gas between a first conduit and a second conduit comprising:

a hollow annular inner member defining a spherically curved, convex, seal receiving surface and an annular seal ring assembly retainer groove which opens outwardly on said convex surface;

a hollow annular outer member mounted over said inner member and defining a spherically curved, concave seal receiving surface which conforms to and which is spaced from said convex surface, said convex surface and said concave surface being movable relative to one another about a common center point, said outer member further defining a first annular seal ring assembly retainer groove which opens inwardly on said concave surface in opposition to said convex surface;

an annular end cap being connected to said outer member and having an end wall which encloses one end of said outer member and which, in combination with said outer member, defines a second annular seal ring assembly retainer groove which opens inwardly in opposition to said convex surface;

a series of seal ring assemblies, a different one of said assemblies being disposed in each said groove, each of said assemblies including at least one seal ring which projects out of a corresponding one of said grooves and which contains a spherically shaped bearing surface which conforms to and which engages an opposing one of said seal receiving surfaces; and wherein an area of the bearing surface of the seal ring contained in said second groove is greater than an area of the bearing surface of the seal ring contained in said first groove.

* * * * *